United States Patent [19]

Kurtz

[11] B 3,924,504

[45] Dec. 9, 1975

[54] SHEARING APPARATUS

[75] Inventor: Albert L. Kurtz, Gates Mills, Ohio

[73] Assignee: The Hill Acme Company, Cleveland, Ohio

[22] Filed: Aug. 17, 1973

[21] Appl. No.: 389,327

[44] Published under the Trial Voluntary Protest Program on January 28, 1975 as document no. B 389,327.

[52] U.S. Cl. ........................ 83/568; 83/583
[51] Int. Cl.² ................................ B26D 1/00
[58] Field of Search ............ 83/568, 583, 611, 636, 83/694

[56] References Cited
UNITED STATES PATENTS 3,757,621   9/1973   Breetvelt........................... 83/694 X

*Primary Examiner*—Willie G. Abercrombie
*Attorney, Agent, or Firm*—Baldwin, Egan, Walling & Fetzer

[57] ABSTRACT

A shearing machine for shearing a workpiece with relatively low power and without attendant curling. The machine includes a pair of knives mounted on a frame with one of the knives being relatively movable toward and away from the other. Also included is a yieldable workpiece support anvil disposed adjacent the stationary blade and below the movable knife for supporting a generally planar workpiece while it is being sheared. The workpiece support anvil is yieldably mounted to effect a constant, even, equal, yield resistance for the anvil in opposition to the movable knife as the workpiece is sheared. One form of such mounting is a leaf spring type mounting for supporting the anvil, whereby the anvil provides a constant even resistance throughout the shearing operation, thereby preventing curling or bending of the workpiece.

1 Claim, 4 Drawing Figures

U.S. Patent   Dec. 9 1975   3,924,504
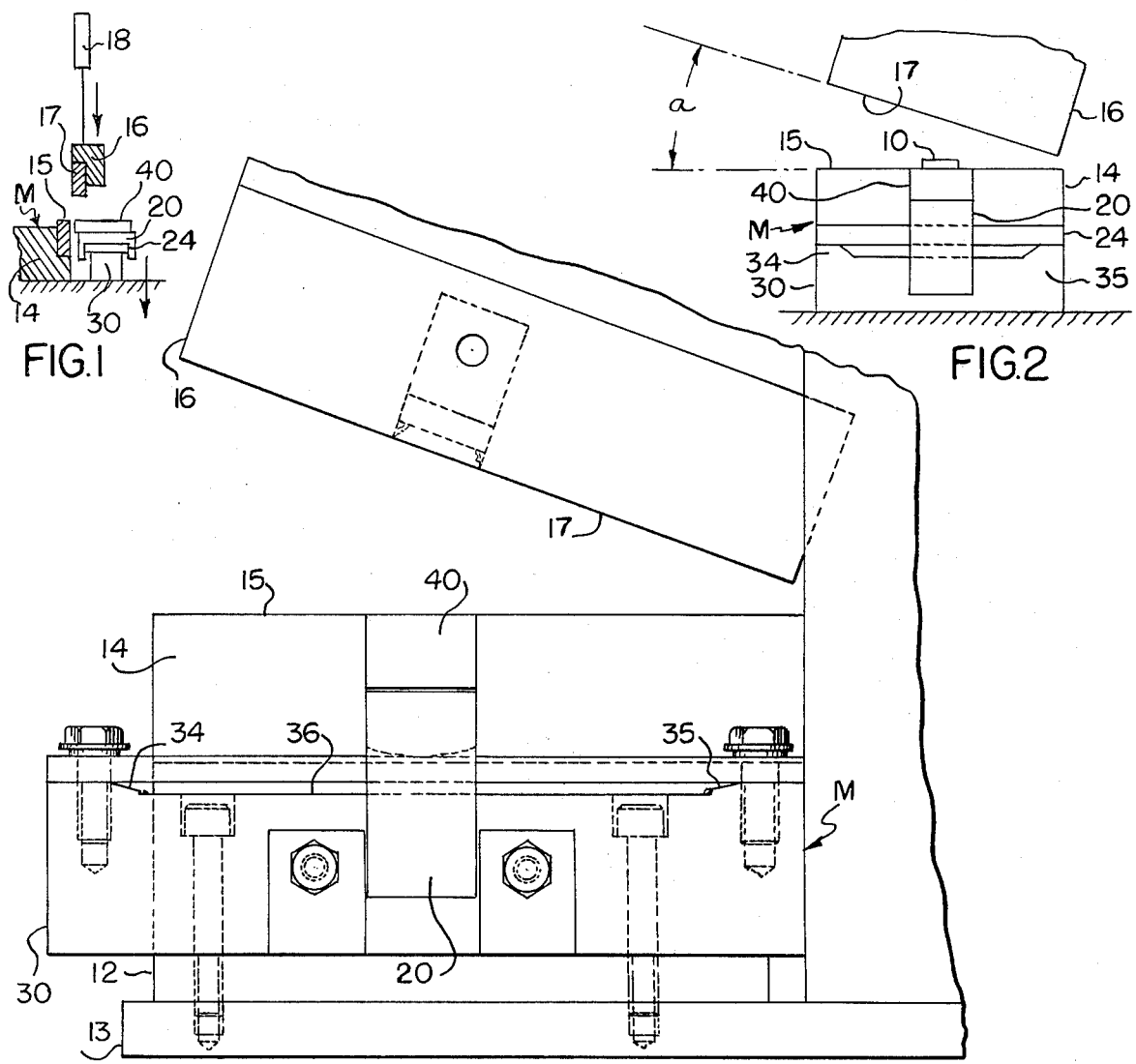
FIG.1
FIG.2
FIG.3
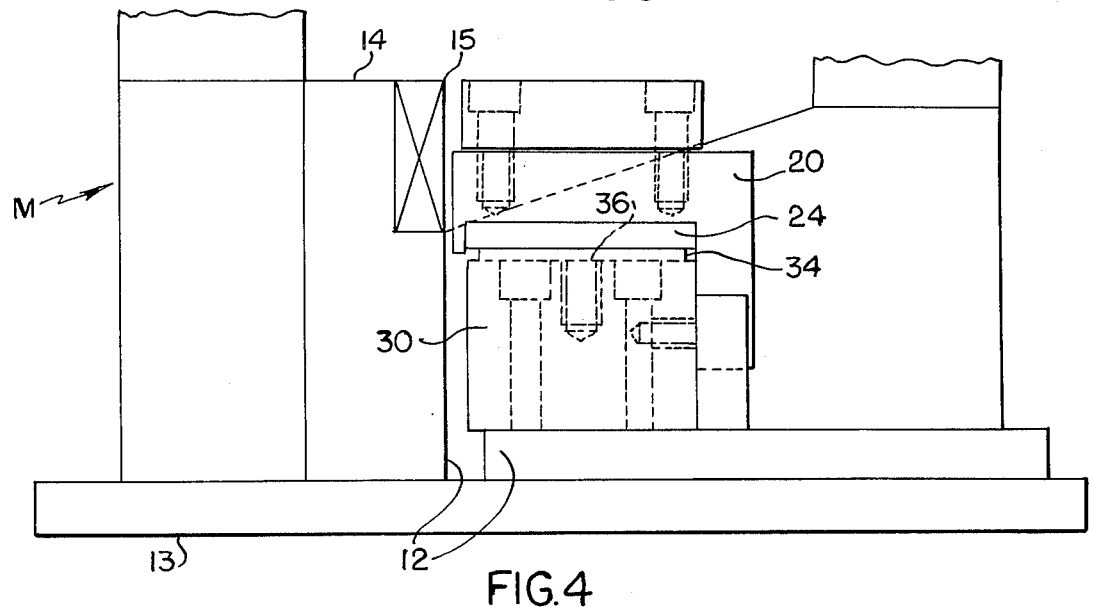
FIG.4

SHEARING APPARATUS

The present invention relates to an improved shearing machine and an improved workpiece support therefor.

There are metal shearing machines of various types in existence. Generally these machines consist of first and second relatively movable knives between which a member to be sheared is placed. Normally a machine of the foregoing type includes a first knife which is rigidly fixed to the frame of the machine and a second knife which is movable toward and away from the first knife. The amount of power required to effect the shearing is dependent on the rake angle of the movable knife. More specifically, the greater the rake angle the less the power requirements, and the less the rake angle the greater the power requirements. In other words, the power requirements vary inversely with the rake angle. However, as the rake angle increases, the workpiece tends to curl and assume a curved shape. In other words, with the above types of shearing machines a straight sheared workpiece cannot be obtained with a knife having a high rake angle. This, in the past, necessitated subsequent forming operations to straighten the curled workpiece. Another way of obviating the curling was to use a knife having a relatively low rake angle, and while this causes the workpiece to be relatively straight, the power requirements of the shearing machine are greatly increased. Thus, according to prior shearing practice there were two alternatives. The first was to effect the shearing with a relatively high rake angle knife and thereafter straighten the curled workpiece with a subsequent metal working operation; or a relatively low rake angle knife could be utilized in a machine having high power requirements. In either event, the shearing was costly because of either the multiplicity of work operations or the high power requirements, which, in turn, required machines which contained relatively high horsepower motors and relatively massive frames.

In view of the above, certain prior art shearing machines attempted to eliminate the curling problem by providing a resilient workpiece support. While such machines may have alleviated the curling problem, they did not eliminate it for the reason that curling can only be prevented if the workpiece support yields with a constant, even and equal resistance throughout the shearing operation. With resiliently mounted workpiece supports, the resistance of such support increases substantially as the shearing operation progresses, thereby effecting curling.

Therefore, it is an object of the present invention to provide an improved shearing machine which will produce a straight workpiece with relatively low power requirements and without any requirement for subsequent metal working operations for straightening the workpiece.

A further object of the present invention is to provide an improved work support for a metal shearing machine which enables said machine to operate with a low rake angle knife at low power requirements without producing attendant curling of a workpiece.

A further object of the invention is to provide a shearing machine of the above type that is simple in construction, inexpensive to manufacture, and highly effective in operation.

Briefly, the aforegoing objects are accomplished by providing a shearing apparatus having a workpiece support that yields with a constant, even, equal resistance during the shearing operation to prevent curling. The improved shearing machine of the present invention which shears a workpiece from a member with relatively low power and without attendant curling of the workpiece includes a frame, a first knife mounted on the frame, a second knife relatively movable with respect to the first knife, and evenly yieldable workpiece support means underlying the second knife for supporting the workpiece with sufficient force as it is sheared to cause the workpiece to be maintained in straight condition, without appreciably increasing the power requirements for effecting the shearing.

In one form of the invention, the workpiece support is mounted on a leaf-spring type mounting means providing two-dimensional yield of the support, thereby effecting a progressively diminishing rake angle and effecting a constant, even, equal, yield for the support to prevent curling of the workpiece. Leaf springs of various predetermined dimensions may be used so that the constant even yield resistance is adjustable to accommodate workpieces of various thicknesses and materials.

Other objects and advantages of the invention will be apparent from the following description taken in conjunction with the drawings wherein:

FIG. 1 is a diagrammatic view of a shearing machine constructed in accordance with the invention;

FIG. 2 is a right hand view of the cutting blades and workpiece support shown in FIG. 1 and showing a workpiece about to be cut and showing the rake angle; in FIGS. 1 and 2 the parts are shown somewhat out of proportion for purposes of clarity;

FIG. 3 is a portional side elevational sectional view of a shearing machine constructed in accordance with the invention, and;

FIG. 4 is a front elevational view of the machine shown in FIG. 3.

Although the invention is shown and described herein with reference to a metal shearing machine, it will be understood that it may be used in any type of two-shear cutting apparatus.

It will also be appreciated that while the drawings have depicted the use of a movable knife which is pivotable about a given point, the principles of the present invention may also be used in the type of a shear wherein the movable knife reciprocates in a rectilinear path toward and away from the stationary knife.

The terms and expressions which are employed are used as terms of description, and not of limitation, and there is no intention, in the use of such terms and expressions, of excluding any equivalents of the features shown and described or portions thereof, but it is recognized that various modifications are possible within the scope of the invention claimed.

In the description, the terms low rake knife and high rake knife were used. A high rake knife is one which is considered to have an angle of approximately five degrees and a low rake knife is one having an angle of approximately 1°. Furthermore, in the following description, the term "power" is used. As used, it means the force required to shear a workpiece and usually this force is measured in pounds or tons. The conventional way of measuring this force is by measuring the stress on the frame of the shear.

Referring to the drawings, there is shown a shearing apparatus or machine M, constructed in accordance with the invention, for shearing as associated planar workpiece 10 with relatively low power and without attendant curling of the workpiece. The machine includes a stationary frame 12 (mounted on a floor plate 13), a stationary knife 14 (having a cutting edge 15) mounted on the frame 12, a movable knife 16 (having a cutting edge 17), movable knife support means 18 mounting the movable knife 16 for movement toward and away from the stationary knife 14 in coacting shearing relation therewith, a workpiece outboard support anvil 20 disposed adjacent the stationary knife 14 and directly below the movable knife 16 in opposition thereto, and anvil mounting means in the form of an elongated leaf-spring 24, mounted on the frame 12 for yieldably supporting the anvil 20.

More specifically, the anvil mounting means includes the elongated base 30 mounted on the frame 12. The base 30 has spaced raised ridges 34, 35, on its upper surface 36. The elongated leaf-spring 24 is supported at its ends on the ridges 34, 35, respectively, such that the mid portion of the spring may resiliently reciprocate. The anvil 20 is supported or disposed on the spring 24 intermediate its ends to provide predetermined resilient vertical reciprocation of the anvil. The anvil supports a work support or work-table 40, such table 40, in turn, supporting the workpiece 10. Work-tables 40 of various sizes may be used to accommodate different types of work pieces.

The movable knife support means 18 is conventional equipment and is not shown in detail as the same, per se, does not constitute the invention.

The elongated leaf spring 24 is mounted in a plane parallel to the elongated knives 14, 16 and provides two-dimensional yield of the anvil, thereby effecting a progressively diminishing rake angle as the workpiece 10 is sheared, as will be hereinafter described in detail. Additionally, the leaf spring mounting effects a constant, even, equal yield resistance for the anvil 20 as the associated workpiece 10 is sheared thereon by the movable knife 16 in coaction with the stationary knife 14. Such even yield resistance is adjustable by using leaf springs of various predetermined dimensions to accommodate workpieces of various thicknesses and materials.

As aforementioned, curling of the workpiece can only be eliminated if the anvil 20 (and the work-table 40 that it supports) yields with a firm, steady, equal resistance throughout the shearing operation in coaction with a low rake angle. In fact, the ideal is to have the knife edge parallel to the workpiece — i.e. a zero rake angle. As shown in FIG. 2, when the movable knife 16 first contacts the workpiece 10 a high rake angle "a" (usually about 5°) results. High rake angles contribute substantially to curling. However, with the present invention, after initial contact of the workpiece 10 by the movable knife 16, the leaf-spring 24 initially yields (with a steady even resistance), thus causing the anvil 20 and the work-table 40 to tilt or rotate slightly clockwise (FIG. 2) thereby progressively changing or diminishing the rake angle so that practically all of the shearing operation is effected with substantially little if any rake angle. In essence, the workpiece follows the contour of the cutting blade, and provides tilting or two-dimensional float of the anvil 20.

It is to be particularly noted that a low rake angle by itself is not necessarily enough to completely eliminate curling. Along with a low (or zero) rake angle, it is imperative to have the anvil 20 yield with a steady, even, equal, yield resistance to the action of the movable knife 16. These two features are effectively accomplished with the afore-described leaf-spring support mechanism of the present invention.

As aforementioned, the steady, even, yield resistance of the anvil 20 is made adjustable by using different size leaf springs. The power needed to shear a light workpiece is minimal and thus the resistance of the anvil 20 is adjusted accordingly by using a light leaf spring. A thick heavy workpiece will require a higher anvil resistance adjustment by using a heavier leaf spring. In practice, it has been found that with the present invention, curling can be eliminated simply by using the proper leaf spring to effect the correct anvil yield resistance for all conventional shearable materials of a wide variety of thicknesses. For example, a material of medium thickness may require a shear force or power of 100,000 pounds in coaction with an anvil yield resistance of a steady 10,000 pounds, while the same material of greater thickness with the same shear force or power may require an anvil shear resistance of 30,000 pounds.

Throughout this description the anvil resistance is described as a steady, even, equal, yield resistance. It is to be understood that this means that if the anvil yield resistance is set at 10,000 pounds, for example, such 10,000 pounds anvil resistance is not only encountered or effected at the beginning of the shear operation, but is effected entirely throughout the shear operation. In other words, the anvil 20 always yields with a steady even 10,000 pounds throughout the entire shearing operation. The aforedescribed leaf-spring support for the anvil 20 effectively provides this action.

I claim:

1. A shearing machine for shearing an associated planar workpiece with relatively low power and without attendant curling of the workpiece comprising, a stationary frame, a stationary knife mounted on said frame, a movable knife, movable knife support means mounting said movable knife for movement toward and away from said stationary knife in coacting shearing relation therewith, a workpiece outboard support anvil disposed adjacent said stationary knife and directly below said movable knife in opposition thereto, and leaf-spring type anvil mounting means on said frame for yieldably supporting said anvil, said mounting means effecting a constant even equal yield resistance for the anvil as an associated workpiece is sheared thereon by said movable knife in coaction with the stationary knife, said anvil mounting means including an elongated base mounted on said frame, said base having spaced raised ridges on its upper surface, and an elongated leaf-spring supported at its ends on said ridges respectively, said anvil being disposed on said spring intermediate its ends and providing two-dimensional yield of the anvil thereby effecting a progressively diminishing rake angle as the workpiece is sheared and providing a constant yield resistance.

* * * * *